(12) United States Patent
Luthi

(10) Patent No.: US 6,918,170 B2
(45) Date of Patent: Jul. 19, 2005

(54) TUBULAR RIVET CONNECTION BETWEEN TWO METAL SHEETS AND METHOD FOR THE PRODUCTION THEREOF

(75) Inventor: Rudolf Luthi, Niederwangen (CH)

(73) Assignee: Adval Tech Holding AG, Niederwangen (CH)

( * ) Notice: Subject to any disclaimer, the term of this patent is extended or adjusted under 35 U.S.C. 154(b) by 103 days.

(21) Appl. No.: 10/297,355

(22) PCT Filed: May 21, 2001

(86) PCT No.: PCT/CH01/00311

§ 371 (c)(1),
(2), (4) Date: May 7, 2003

(87) PCT Pub. No.: WO01/94797

PCT Pub. Date: Dec. 13, 2001

(65) Prior Publication Data

US 2003/0170073 A1 Sep. 11, 2003

(30) Foreign Application Priority Data

Jun. 8, 2000 (CH) .............................................. 1131/00

(51) Int. Cl.[7] .............................................. B23P 11/00
(52) U.S. Cl. .......................... 29/509; 29/521; 403/282
(58) Field of Search .................... 29/509, 521; 403/274, 403/282

(56) References Cited

U.S. PATENT DOCUMENTS

| | | | | |
|---|---|---|---|---|
| 1,252,289 A | * | 1/1918 | Murray, Jr. ................... | 29/521 |
| 3,502,130 A | * | 3/1970 | Gulistan ..................... | 411/361 |
| 3,791,016 A | * | 2/1974 | Eberhardt et al. ............. | 29/521 |
| 3,828,517 A | * | 8/1974 | Johnson ....................... | 29/505 |
| 5,203,812 A | * | 4/1993 | Eckold et al. ................ | 29/521 |
| 6,502,295 B1 | * | 1/2003 | Morgand ...................... | 29/509 |

FOREIGN PATENT DOCUMENTS

| | | |
|---|---|---|
| DE | 918090 | 2/1954 |
| DE | 3936967 A1 | 8/1990 |
| FR | 2371252 | 6/1978 |
| WO | WO0194797 A1 | 12/2001 |

* cited by examiner

*Primary Examiner*—David P. Bryant
(74) *Attorney, Agent, or Firm*—Tarolli, Sundheim, Covell & Tummino L.L.P.

(57) ABSTRACT

The invention relates to a tubular rivet connection between at least one first (1) and one second metal sheet (2). According to the invention, the tubular rivet (3) is made from the metal of the first metal sheet (1) by deforming, in a drawing direction (Z), the edge area of a first hole (4) located in the first metal sheet (1) into a second, larger hole (5) located in the second metal sheet (2), whereby the second hole (5) located in the second metal sheet (2) is, in particular, gradually enlarged with regard to its diameter in the drawing direction (Z). The invention provides that the tubular rivet (3) is shorter in length in the drawing direction (Z) than the thickness of the second metal sheet (2). To this end, the thickness tolerance of commercially available metal sheets is taken into account and damages to the tools and/or the formation of chips is/are prevented. With regard to the method for producing such a tubular rivet connection, the invention provides that the second metal sheet (2) is supported by a matrix, which has a diameter approximately corresponding to the diameter of the hole (5) in the second metal sheet (2).

9 Claims, 3 Drawing Sheets a)

b)

TUBULAR RIVET CONNECTION BETWEEN TWO METAL SHEETS AND METHOD FOR THE PRODUCTION THEREOF

TECHNICAL FIELD

The present invention relates to a tubular rivet connection between at least one first metal sheet and a second metal sheet, the tubular rivet being produced from the material of the first metal sheet by deforming, in a drawing direction, the edge region of a first hole in the first metal sheet into a second, larger hole in the second metal sheet, the tubular rivet not projecting beyond the second metal sheet, and the second hole in the second metal sheet being widened with regard to its diameter in the drawing direction.

The invention also relates to a method of producing such a tubular rivet connection, the second metal sheet being supported by a die.

PRIOR ART

A tubular rivet connection of the aforesaid type has been disclosed, for example, by FR 2371252, the diameter of the second hole being widened in a stepped manner. In the drawing direction, the tubular rivet terminates flush with the rear side of the second metal sheet. This is achieved by using a die for supporting the second metal sheet, this die having a smaller diameter than the hole in the second metal sheet. The diameter of the die is matched to the drawing punch used. The drawing punch has a section tapering toward its free end and having a cylindrical part.

DE 918 090 discloses a tubular rivet connection between two metal sheets, the second metal sheet [lacuna] provided with a bore widening conically in the drawing direction. The two metal sheets, with the second metal sheet at the bottom, are placed on a base which contains a bore into which a punch can be moved with its tapered end (point) in the drawing direction. When the punch is moved down, first of all a hole is formed in the top, first metal sheet by means of the point of the punch. In the process, the punch first of all draws some material from the first metal sheet into the widening bore in the second metal sheet. When the punch is moved down further, a recess 8 is then formed in the top metal sheet with the thicker part of the punch, the bore in the second-metal sheet being completely filled with the displaced material. In this way, the tubular rivet again terminates flush with the second metal sheet. An extremely firm connection and a completely smooth external appearance are obtained.

DE 39 36 967 A1 discloses a method of connecting two metal sheets, one of the sheets [lacuna] relatively thin and being made of a soft and free-flowing material. The other metal sheet is provided with widening apertures and is made of a harder material. By means of a forming punch, the metal sheet made of the free-flowing material is pressed onto the second metal sheet and in a positive-locking manner into the apertures provided in the latter. The entire operation takes place on a base, so that the material pressed into the apertures terminates flush with the metal sheet made of the harder material. During this joining technique, a central hole is not produced in the rivet produced. To this extent, the rivet is not a tubular rivet.

DESCRIPTION OF THE INVENTION

The object of the present invention is to further improve a tubular rivet connection of the type mentioned at the beginning in particular with regard to the reliability with which it can be made in series production. With regard to the design of the tubular rivet connection, this object is achieved according to the invention in that the tubular rivet is designed to be shorter with regard to its length in the drawing direction than the thickness of the second metal sheet.

With regard to the method of producing such a tubular rivet connection, the invention proposes to support the second metal sheet by a die which, has a diameter which approximately corresponds to the diameter of the hole in the second metal sheet.

The invention is based on the knowledge that commercially available metal sheets have a certain thickness tolerance within the range of around +−5% relative to a desired value. With regard to the tool arrangement used and the tubular rivet to be produced, in the methods according to the prior art which have been explained, provided the first metal sheet is within the plus range and the second metal sheet is within the minus range, there is more material at the first metal sheet than can flow into the hole in the second metal sheet. In the process, there is then the risk of the excess material being squeezed into the gap between the drawing punch and the drawing die. If this is the case, either the rivet may jam, the die may break, residual material of the rivet may tear off and/or a chip may form. None of this is tolerable, at least in series production, in particular if the rivet connection is merely one step of a multi-stage process using a very expensive transfer tool in a press operating with a high number of strokes.

By the tubular rivet being designed according to the invention to be shorter with regard to its length in the drawing direction than the thickness of the second metal sheet, the abovementioned problems can be avoided at least to a statically very high degree. The length of the tubular rivet is preferably selected with due regard to the respective thickness fluctuations of the metal sheets used. The length of the tubular rivet can be set in a simple manner by suitable matching of the hole diameters in the first and the second metal sheets.

By the rivet according to the invention being designed to be shorter than the thickness of the second metal sheet, the die used for supporting the second metal sheet, unlike in the prior art explained, need no longer project into the region of the second hole and thereby limit the drawing-out of the rivet beyond the second metal sheet. On the contrary, the diameter of the die may be selected to be larger, in particular about the same size as the diameter of the second hole. The result of this is that a gap is produced between the part of the drawing punch which plunges into the die and the die, this gap being large enough to avoid the abovementioned problems even if, on account of an extremely unfavorable thickness ratio between the two metal sheets, the rivet should nonetheless be drawn out beyond the second metal sheet.

As a further advantage of the invention may be considered the fact that the second metal sheet, with regard to its thickness, can be dimensioned within substantially wider limits. At least one further metal sheet could be inserted between the first and the second metal sheet. As in the prior art, the tubular rivet connection according to the invention does not jut out in any way on any of the outer sides of the sheet metal stack.

Advantageous and therefore preferred embodiments of the invention are characterized in the dependent claims.

BRIEF EXPLANATION OF THE DRAWINGS

The invention will be explained in more detail below with reference to exemplary embodiments in connection with the drawing, in which.

WAYS OF IMPLEMENTING THE INVENTION

Figure 2:
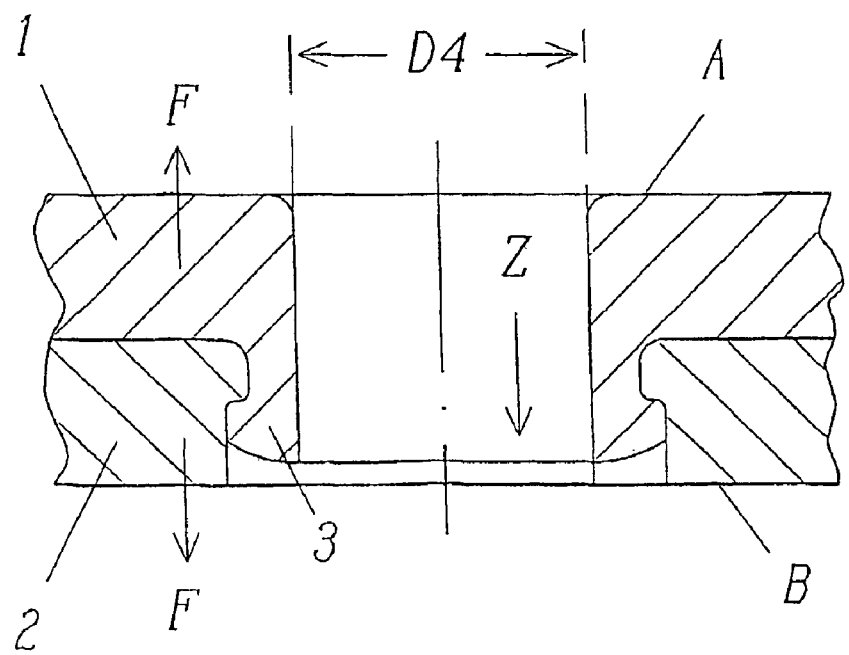
FIG. 2 shows the two metal sheets with the finished tubular rivet connection according to the invention.

In the drawing, 1 designates a first metal sheet and 2 designates a second metal sheet which bear flat against one another. In FIG. 2, a drawn collar or the tubular rivet of the tubular rivet connection is designated by 3.

Figure 1:
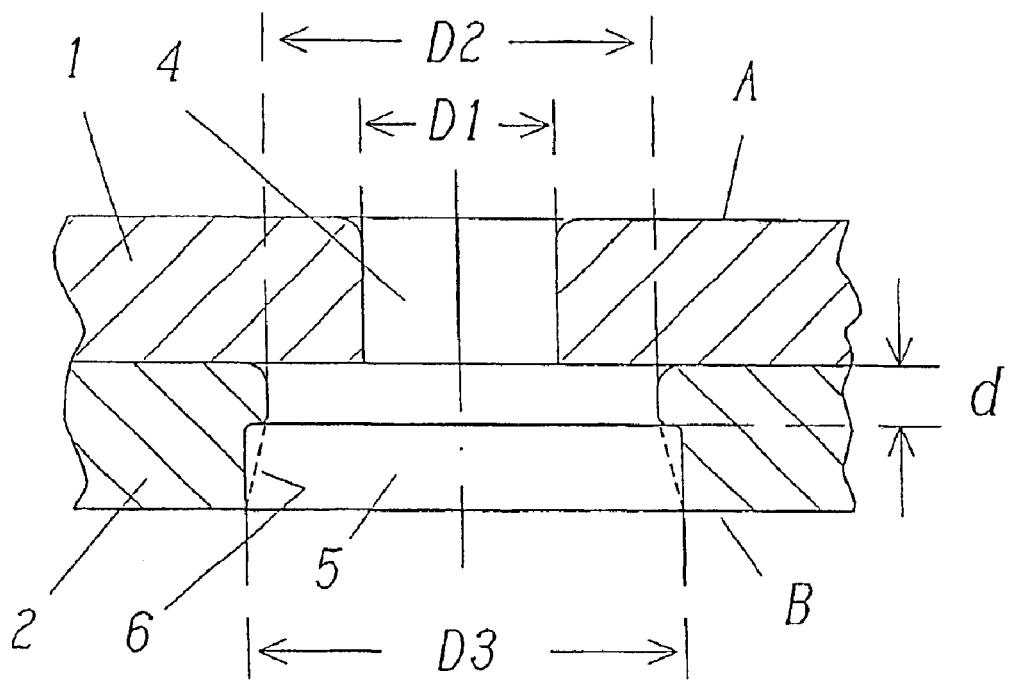
FIG. 1 shows a section of two metal sheets which are to be connected to one another and in which the holes necessary for producing a tubular rivet connection according to the invention are already provided.

FIG. 1 shows the two metal sheets 1 and 2 before the drawn collar or tubular rivet 3 has been drawn out. Here, the first metal sheet 1 is provided with a first hole 4 having a diameter D1. There is likewise a hole 5 in the second metal sheet 2, but this hole 5 is larger than the first hole 4. In addition, this second hole 5 has a diameter widening away from the first metal sheet 1 (subsequent drawing direction Z). In the preferred embodiment and as also shown in the drawing, this widening is stepped with a smaller diameter D2 and a larger diameter D3.

FIG. 2 shows the finished tubular rivet connection, in which the drawn collar 3 is formed in the second hole 5 around the step formed therein, as a result of which a positive-locking connection is produced which withstands very high separating forces F. The tubular rivet 3 is designed to be shorter with regard to its length in the drawing direction Z than the thickness of the second sheet 2 in order to take into account thickness tolerances of the metal sheets around +/−5% in each case.

Figure 3:
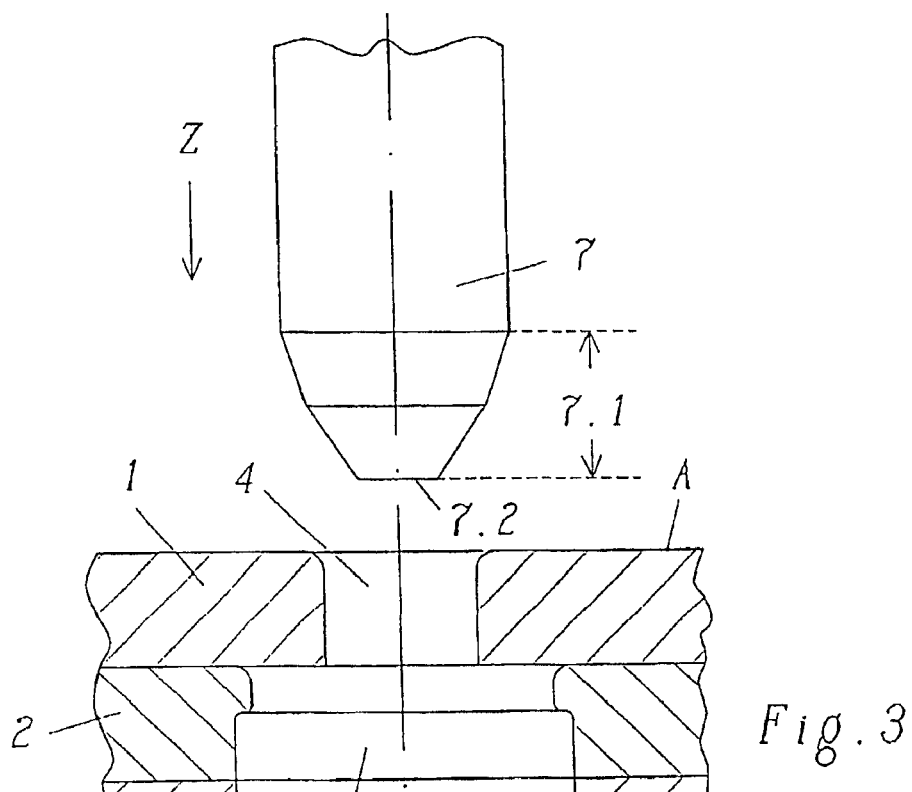
FIG. 3 shows the two metal sheets together with a collar drawing punch and a die before the tubular rivet has been drawn out.
Figure 4:
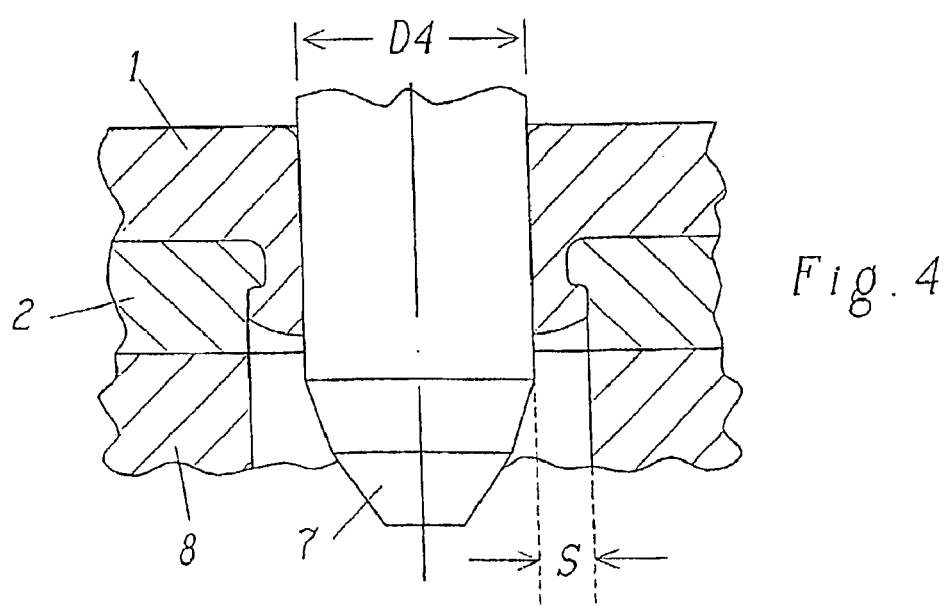
FIG. 4 shows the two metal sheets together with a collar drawing punch and a die after the tubular rivet has been drawn out.

The tubular rivet connection according to FIG. 2 can be produced with a suitable collar drawing punch 7 in a single working step starting from the structure according to FIG. 1, as shown in FIGS. 3 and 4. In this case, the diameter D1 of the first hole 4 in the first metal sheet 1 is widened from its side A in the direction toward the second metal sheet 2 to a diameter D4, with the material in the marginal region of the first hole 4 undergoing plastic deformation and with the drawn collar 3 being formed in the second hole 5, in such a way that the material of the first metal sheet 1, during its plastic deformation in the second hole 5, also flows over the step formed therein into the larger diameter D3. In the process, for forming the drawn collar 3, the second metal sheet 2 acts as a die. The second metal sheet 2 is in turn supported by the die 8.

The diameter D5 of the die is dimensioned to be approximately equal to the diameter D3 of the second hole 5 in the second metal sheet 2, so that a gap S is obtained between the die 8 and the collar drawing punch 7 when the latter has plunged into the die according to FIG. 4. The gap S ensures that damage to the 7 and/or the die 8 can be avoided even if, on account of an extremely unfavorable thickness ratio between the two metal sheets 1 and 2, despite the short design according to the invention of the tubular rivet 3, there is at some time more material at the first metal sheet 1 than can flow into the hole 5 in the second metal sheet 2.

Figure 5:
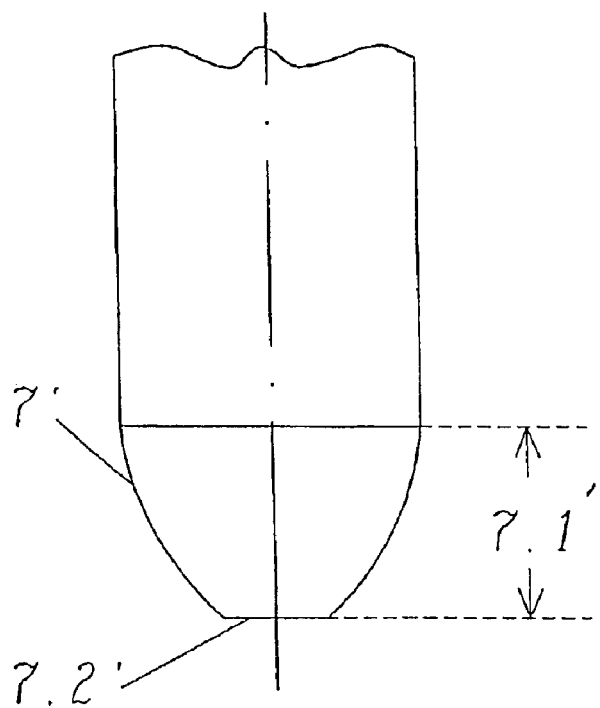
FIG. 5 shows a further collar drawing punch.

The collar drawing punch 7 in FIGS. 3 and 4 has a beveled section 7.1 which tapers toward its free end 7.1 at an angle always differing from zero but continuously relative to the drawing direction Z. At any rate, the collar drawing punch 7 is not cylindrical along the section 7.1. FIG. 5 shows a collar drawing punch 7' having a rounded front section 7.1' which likewise tapers continuously relative to the drawing direction Z toward its free end 7.2'.

Figure 6:
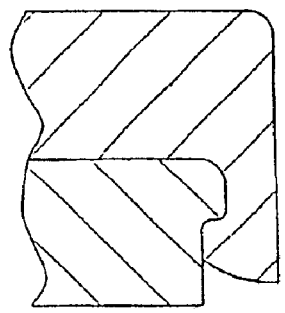
FIG. 6 shows a) a convex and b) a concave design of the tubular-rivet according to the invention.
Figure 6:
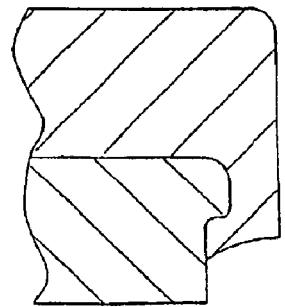

Depending on the punch form, the tubular rivet 3 can be drawn out in a different ways, e.g. convexly according to FIG. 6a) or also concavely according to FIG. 6b). Practice decides in each case the design which is used.

The tubular rivet connection shown in FIG. 2 could also be produced in two steps, in which case, in a first step, only a "straight" drawn collar, i.e. a drawn collar which is not yet formed around the step in the second metal sheet, would be produced. Only in the second step is this drawn collar then formed in the second metal sheet 2 by partly pressing back from side B.

Instead of providing a step in the second hole 5, it would also be possible to simply widen the second hole continuously outward, e.g. conically outward, as likewise indicated in FIG. 1 by broken lines and designated by 6. However, the separating forces F which can be achieved are not quite so high in this case as with a step, for which reason the latter is preferred. However, a step and conical widening could also be provided in combination with one another.

The tubular rivet connection is suitable in particular for connecting two metal sheets having a thickness of between 2 and 4 mm. In the case of metal sheet thicknesses around 3 mm and when a step is formed, the transition between the two diameters D2 and D3 is preferably positioned in such a way that the thickness d of the section having the smaller diameter D2 is about ¼ to ½ the thickness of the second sheet 2. The diameter D3 may in this case be larger than the diameter D2 by 5–15%, but preferably by about 10%, of the thickness of the second sheet 2. In the case of conical widening, the cone angle should be between 5° and 15°, in particular about 10°, and thus should at any rate be larger than the angle which would result as an angle of a "naturally" forming stamping cone, e.g. when stamping out the second hole 2 from side A.

The widening (stepped and/or continuous) of the hole 5 can be produced in the second metal sheet 2, e.g. in two steps, by first of all only a hole having the diameter D2 being produced in a first step. In a second step, this hole, from side B of the second metal sheet 2, is then widened to the diameter D3 with a punch to the desired depth. Since material flow into the region of thickness d may occur in the process, the diameter D2, if need be, must be slightly overdimensioned to begin with. In a "progressive tool", the hole having the diameter D2 can be produced in a first station by stamping from side A with a conventional stamping punch and a corresponding die. In a following second station, the partial widening of this hole can then be effected by the metal sheet 2 being put down with its side B on a spring-mounted plate and by being pressed downward by the top part of the tool together with the spring-mounted plate over a fixed punch projecting from the spring-mounted plate.

Alternatively, the hole 5 in the second metal sheet 2, with its widening, could also be produced in a single working step from side B with a piercing punch which has a step from diameter D2 to diameter D3 or suitable continuous widening in its rear region.

LIST OF DESIGNATIONS

1 First metal sheet

2 Second metal sheet

3 Drawn collar or tubular rivet
4 First hole in the first metal sheet
5 Second hole in the second metal sheet
6 Conical widening
7 Collar drawing punch
7.1 Front section of the collar drawing punch
7.2 Front, free end of the collar drawing punch
8 Die
D1–D5 Diameter
A Side of the first metal sheet
B Side of the second metal sheet
d Thickness of the section having diameter D2
F Separating forces
Z Drawing direction

What is claimed is:

1. A tubular rivet connection between at least one first metal sheet (1) and a second metal sheet (2), the tubular rivet (3) being produced from the material of the first metal sheet (1) by deforming, in a drawing direction (Z), the edge region of a first hole (4) in the first metal sheet (1) into a second, larger hole (5) in the second metal sheet (2), and the second hole (5) in the second metal sheet (2) being widened with regard to its diameter in the drawing direction (Z), characterized in that the tubular rivet (3) is designed to be shorter with regard to its length in the drawing direction (Z) than the thickness of the second metal sheet (2).

2. The tubular rivet connection as claimed in claim 1, characterized in that the diameter (D2, D3) of the second hole (5) in the second metal sheet (2) is widened in a stepped manner in the drawing direction (Z).

3. The tubular rivet connection as claimed in claim 2, characterized in that the stepped widening of the diameter of the second hole (5) is between 5% and 15%, but preferably about 10%, of the second metal sheet (2).

4. The tubular rivet connection as claimed in claim 2, characterized in that the stepped widening from a smaller diameter (D2) to a larger diameter (D3) in the second sheet (2) is positioned in such a way that the thickness (d) of the section having the smaller diameter (D2) is about ¼ to ½ the thickness of the second metal sheet (2).

5. The tubular rivet connection as claimed in claim 1, characterized in that the diameter of the hole (5) in the second metal sheet (2), in the drawing direction (Z), is widened continuously, in particular conically, at least in sections.

6. The tubular rivet connection as claimed in claim 5, characterized in that the angle ($\alpha$) of the conical widening (6) is between 5° and 15°, but preferably about 10°.

7. A method of producing a tubular rivet connection as claimed in claim 1, comprising the steps of positioning said first metal sheet (1) on said second metal sheet (2) such that the first hole (4) and the second hole (5) are in alignment, supporting said second metal sheet (2) by a die (8), having a diameter (D5) which approximately corresponds to the diameter (D3) of the second hole (5) in the second metal sheet (2), and deforming, in a drawing direction (Z), the edge region of said first hole (4) in said first metal sheet (1) into said second, larger hole (5) in said second metal sheet (2).

8. The method of producing a tubular rivet connection as claimed in claim 7, wherein the step of deforming is carried out by means of a punch (7) which is moved in the drawing direction (Z) and has a section tapering toward its free end, wherein said section tapers continuously toward the free end at an angle always differing from zero relative to the drawing direction.

9. The method of producing a tubular rivet connection as claimed in claim 8, wherein the step of deforming is carried out by means of said punch (7), wherein said section of the punch (7) is provided with bevels and/or is designed to be curved.

* * * * *